United States Patent [19]

Krall

[11] 4,348,238

[45] Sep. 7, 1982

[54] MANUFACTURE OF CELLULOSE ESTER FILM

[75] Inventor: Harry J. Krall, Webster, N.Y.

[73] Assignee: Eastman Kodak Company, Rochester, N.Y.

[21] Appl. No.: 163,249

[22] Filed: Jun. 26, 1980

[51] Int. Cl.³ ............................................. C08B 1/00
[52] U.S. Cl. ..................................... 106/177; 264/213
[58] Field of Search ........................... 106/177, 18.18; 264/130, 213, 300, 331, 338; 260/950, 951

[56] References Cited

U.S. PATENT DOCUMENTS

| 2,275,716 | 3/1942 | Bachman et al. | 106/181 |
| 3,033,889 | 5/1962 | Chiddix et al. | 260/925 |
| 3,194,866 | 7/1965 | Gibson et al. | 264/211 |
| 3,291,625 | 12/1966 | Faraone et al. | 106/196 |
| 3,326,919 | 6/1967 | Wake et al. | 260/924 |
| 3,528,833 | 9/1970 | Taskier | 106/171 |
| 3,770,495 | 11/1973 | Lenz et al. | 264/130 |
| 3,778,417 | 12/1973 | Serres et al. | 260/30.6 R |
| 3,793,043 | 2/1974 | Dresie et al. | 106/194 |

FOREIGN PATENT DOCUMENTS 745638 11/1966 Canada .............................. 260/950

Primary Examiner—Theodore Morris
Attorney, Agent, or Firm—A. P. Lorenzo

[57] ABSTRACT

Incorporation of a polyethoxylated phosphate ester in a film-forming composition containing a cellulose ester dissolved in a solvent medium has been found to promote stripping of the film from the surface on which it is cast. Such use of polyethoxylated phosphate esters as stripping aids is especially advantageous in the manufacture of cellulose ester film base in the photographic industry.

15 Claims, No Drawings

MANUFACTURE OF CELLULOSE ESTER FILM

FIELD OF THE INVENTION

This invention relates in general to the manufacture of cellulose ester film and in particular to improved compositions and methods for forming cellulose ester film by the casting technique. More specifically, this invention relates to the incorporation of a stripping aid in a film-forming cellulose ester composition in order to facilitate stripping of the cellulose ester film from the casting surface upon which it is formed.

BACKGROUND OF THE INVENTION

In a well known and widely utilized process for the manufacture of cellulose ester films, a "dope" is formed by dissolving a cellulose ester in a solvent or mixture of solvents, the dope is cast upon a smooth surface such as a stainless steel belt or a casting wheel with a nickel-plated or chromium-plated surface, part of the solvent is evaporated from the dope in order to form a material with sufficient strength to retain its form, and the film is stripped from the surface upon which it was cast. In this process, the speed at which the casting operation can be successfully conducted is dependent upon how quickly the film can be stripped from the casting surface, which in turn depends upon how fast the film attains sufficient strength to be stripped. If the film is stripped prematurely, a problem of delamination is encountered, i.e., the coating tends to split within its thickness, leaving part of the composition adhered to the casting surface.

It is well known to incorporate a stripping aid in the cellulose ester composition in order to reduce the time required before the coating can be stripped from the casting surface without encountering delamination. The stripping aids function to reduce the tension required to strip the film from the casting surface, and/or to promote the rapid attainment of film strength, and thereby enable the film to be stripped sooner than is feasible without their use. A variety of materials are known to be useful as stripping aids in cellulose ester compositions including, for example, the dialkyl esters of sulfosuccinic acid of U.S. Pat. No. 2,275,716, the fatty acids of U.S. Pat. No. 3,528,833, and the metallic salts of U.S. Pat. No. 3,793,043. However, materials heretofore proposed for this purpose often exhibit a less than adequate degree of improvement in stripping characteristics and/or cause deleterious effects which limit the usefulness of the resulting product. For example, the dialkyl esters of sulfosuccinic acid can accelerate the degradation of cellulose esters, fatty acids can interfere with the application and adhesion of subsequent coatings, and metallic salts can impart an undesirable coloration to the film which interferes with photographic applications.

It is toward the objective of providing new and improved film-forming cellulose ester compositions, containing novel stripping aids which exhibit a highly desirable combination of characteristics that overcome the disadvantages and limitations of the prior art, that the present invention is directed.

SUMMARY OF THE INVENTION

In accordance with this invention, the manufacture of cellulose ester films by the casting technique is significantly improved by incorporating in the film-forming cellulose ester composition a polyethoxylated phosphate ester in an amount sufficient to promote stripping of the film from the surface upon which it is cast. It has been found that the polyethoxylated phosphate esters are compatible with cellulose esters, as evidenced by the clear films that are obtained from dopes containing these materials, that they exhibit no significant adverse effects on the characteristics of the film when used in the required small amounts, and that they greatly reduce the time required before the film can be successfully stripped from the casting surface.

DESCRIPTION OF THE PREFERRED EMBODIMENTS

The present invention is of particular utility in the manufacture of photographic film base from cellulose esters. Thus, for example, films prepared using the stripping aids of this invention exhibit the high degree of transparency necessary for this use, and the stripping aid exhibits no undesirable photographic effects. However, the present invention is useful in any process in which cellulose ester compositions are stripped from a casting surface in the form of film or sheeting, regardless of the intended use of the product. As used herein, the term "film" is intended to encompass products of any desired thickness, including those which are very thin and typically referred to as "films" and those of relatively greater thickness which are typically referred to as "sheet materials."

Cellulose ester dopes useful in the preparation of cellulose ester films are well known and have been described in numerous patents and publications. Useful cellulose esters include lower fatty acid esters of cellulose such as cellulose acetate, cellulose propionate and cellulose butyrate and mixed lower fatty acid esters of cellulose such as cellulose acetate propionate, cellulose acetate butyrate and cellulose propionate butyrate. The cellulose ester is dissolved in a solvent or mixture of solvents, typically in an amount of from about 0.15 to about 0.25 parts of cellulose ester per part of solvent medium by weight. Useful solvents include alcohols, ketones, esters, ethers, glycols, hydrocarbons and halogenated hydrocarbons.

Preferred alcohols for use in the cellulose ester compositions of this invention are lower aliphatic alcohols containing 1 to 6 carbon atoms, such as methanol, ethanol, n-propyl alcohol, isopropyl alcohol, n-butyl alcohol, isobutyl alcohol, n-pentyl alcohol, n-hexyl alcohol, and the like.

Preferred ester solvents for use in the cellulose ester compositions of this invention are those represented by the formula RCOOR′ where R and R′ are alkyl groups of 1 to 4 carbon atoms, such as methyl acetate, ethyl acetate, n-propyl acetate, isobutyl acetate, ethyl propionate, ethyl isobutyrate, and the like.

Preferred ketone solvents for use in the cellulose ester compositions of this invention are those represented by the formula

where R and R′ are alkyl groups of 1 to 4 carbon atoms, such as acetone, methyl ethyl ketone, methyl n-propyl ketone, diethyl ketone, and the like.

Other particularly useful solvents include hydrocarbons, such as cyclohexane, and halogenated hydrocarbons, such as methylene chloride and propylene chloride.

More than one member of a particular class of compounds, for example, two different alcohols or two different ketones can be used, if desired, or the solvent medium can comprise a mixture of compounds from several different classes, such as a mixture of an alcohol, a ketone and a halogenated hydrocarbon. A particularly preferred solvent system comprises a mixture of methanol, acetone and methylene chloride.

In addition to the cellulose ester and solvent, the dope used for forming a cellulose ester film usually contains a plasticizer. Useful plasticizers include dimethyl phthalate, diethyl phthalate, triethyl phosphate, triphenyl phosphate, triethyl citrate, dibutyl sebacate, methoxymethyl phthalate, di-(2-methoxyethyl) phthalate, and the like.

In forming a cellulose ester film, the dope is cast as a thin uniform layer on a very smooth surface. The casting surface can be an endless belt, for example, a belt composed of stainless steel. More usually, the casting surface is the surface of a casting wheel, usually a wheel of very large diameter having a highly polished nickel-plated or chromium-plated surface. The wheel is operated at a slow speed such that sufficient solvent evaporates from the cast dope during the major portion of a single revolution of the wheel that the film can be successfully stripped from the wheel. After stripping, the film is dried to remove residual solvent. Typical conditions utilized involve a casting wheel time of up to about 4 minutes at a wheel temperature in the range of from about 20° C. to about 35° C., followed by drying for a period of about 15 minutes to about 60 minutes at a temperature in the range of from about 80° C. to about 160° C.

It is conventional practice in the art to characterize a cellulose ester dope by reference to its "green peel time." This time refers to the time in seconds required for the dope to "set up" with sufficient strength that it can be stripped from the casting surface without delamination.

In accordance with this invention, a polyethoxylated phosphate ester is incorporated in the cellulose ester composition in an amount sufficient to promote stripping of the film from the surface upon which it is cast, i.e., in an amount sufficient to reduce the "green peel time." Typically, the amount of polyethoxylated phosphate ester utilized is in the range of from about 0.0005 to about 0.02 parts per part by weight of cellulose ester, and preferably in the range of from about 0.001 to about 0.01 parts per part by weight.

Polyethoxylated phosphate esters which are useful for the purpose of this invention include compounds of the formula:

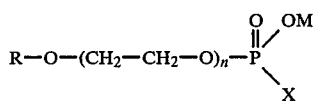

wherein R is a hydrocarbyl radical such as an alkyl, aryl, aralkyl or alkaryl radical, preferably alkyl of 1 to 12 carbon atoms or alkaryl of 7 to 18 carbon atoms; n is an integer of from 1 to 100 and preferably from 1 to 20; M is hydrogen, ammonium, an alkali metal or an amino radical; and
X is an —OM group or an R—O—(CH$_2$—CH$_2$—O)$_n$— group.

Where X is an —OM group, the compound is a monoester,
where X is an R—O—(CH$_2$—CH$_2$—O)$_n$— group, it is a diester.

Monoesters, diesters and mixtures of monoesters and diesters are all useful as stripping aids.

Preferred polyethoxylated phosphate esters for the purposes of this invention are compounds of the above formula wherein R is an

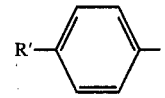

group in which R' is an alkyl radical of 1 to 8 carbon atoms.

The polyethoxylated phosphate esters are well known materials which are available commercially, for example, they are sold under the trademark GAFAC by GAF Corporation and under the trademark EMPHOS by Witco Chemical Corporation.

The polyethoxylated phosphate esters dissolve readily in solvents commonly used in the preparation of cellulose ester dopes. They are compatible with the cellulose esters as evidenced by the clear films prepared from dopes in which they have been incorporated. In addition to serving as highly effective stripping aids, they are advantageous in that they function as fire retardants in the cellulose ester film.

In the manufacture of cellulose ester films by the casting technique, it is well known to use "gelling solvents." These are compounds, such as for example, methanol, butyl alcohol, cyclohexane, and the like, which accelerate the rate at which the dope "sets up" and thereby facilitate the use of higher casting speeds. However, these solvents are very slow to evaporate, and the presence of residual gelling solvents in the cellulose ester film can cause serious difficulties. For example, the gradual dissipation of such solvents with time can result in excessive shrinkage of the film. Also, the presence of gelling solvents in the film can render the film more flammable and increase the burning rate, thereby necessitating the use of high concentrations of fire retardant additives. Use of the polyethoxylated phosphate esters as stripping aids, in accordance with this invention, can eliminate the need to use gelling solvents or reduce the concentration at which they are employed. Furthermore, the dope can contain a high concentration of cellulose ester dissolved in a solvent with high solvent power, and thereby reduce the volume of solvent which must be removed to a minimum.

The invention is further illustrated by the following examples of its practice:

EXAMPLE 1

A film-forming composition was prepared by combining 16.00 parts by weight of cellulose acetate, 2.40 parts by weight of triphenyl phosphate and 81.60 parts by weight of a solvent mixture consisting of 86.8 parts by weight methylene chloride, 12.2 parts by weight methanol, and 1.0 parts by weight acetone. A polyethoxylated phosphate ester, commercially available from GAF Corporation under the trademark GAFAC RM-410, was added to portions of this composition in varying amounts as indicated below, and films were prepared by casting and stripping, in the manner herein-before described, using a chromium-plated casting surface. The "green peel time" was measured for each film with the following results:

| Test No. | Amount of GAFAC RM-410 (parts by weight) | Green Peel Time (seconds) |
| --- | --- | --- |
| 1 | 0 | 75 |
| 2 | 0.016 | 60 |
| 3 | 0.04 | 55 |
| 4 | 0.08 | 50 |
| 5 | 0.12 | 45 |

As shown by the above data, the green peel time of 75 seconds exhibited by this composition was reduced to 60 seconds by addition of 0.016 parts of polyethoxylated phosphate ester (amounting to 0.001 parts per part of cellulose acetate by weight) and to 45 seconds by addition of 0.12 parts of polyethoxylated phosphate ester (amounting to 0.0075 parts per part of cellulose acetate by weight).

EXAMPLE 2

Film-forming compositions, designated herein as Compositions A through J, were prepared by combining 15.81 parts by weight of cellulose acetate, 2.82 parts by weight of triphenyl phosphate, and 81.37 parts by weight of a solvent mixture as described below. Composition A contained no polyethoxylated phosphate ester whereas each of compositions B through J contained 0.01 parts by weight of the polyethoxylated phosphate ester GAFAC RM-410. The "green peel times" were measured for the films prepared from these compositions and the results obtained were as follows:

| | Solvent Mixture | | | | | Green Peel Time (seconds) |
| --- | --- | --- | --- | --- | --- | --- |
| Composition | Methylene Chloride | Acetone | Methanol | Cyclohexane | Butyl Alcohol | |
| A | 86.8 | 0.7 | 6.8 | 5.7 | 0 | 70 |
| B | 86.8 | 0.7 | 6.8 | 5.7 | 0 | 60 |
| C | 86.8 | 0 | 13.2 | 0 | 0 | 50 |
| D | 93.2 | 0 | 6.8 | 0 | 0 | 60 |
| E | 86.8 | 1.0 | 12.2 | 0 | 0 | 45 |
| F | 86.8 | 2.0 | 11.2 | 0 | 0 | 60 |
| G | 86.8 | 4.0 | 9.2 | 0 | 0 | 50 |
| H | 86.8 | 1.0 | 11.7 | 0 | 0.5 | 55 |
| I | 86.8 | 1.0 | 11.2 | 0 | 1.0 | 50 |
| J | 86.8 | 1.0 | 10.2 | 0 | 2.0 | 55 |

As shown by the above data, the green peel time for Composition A, which contained no polyethoxylated phosphate ester, was 70 seconds, whereas the green peel time for Composition B, which contained the same solvent mixture as Composition A but did contain polyethoxylated phosphate ester, was 60 seconds. Compositions C through J differed from Composition B only in regard to the difference in solvent mixture and exhibited green peel times ranging from a low of 45 seconds to a high of 60 seconds, thereby indicating that solvent composition is also a significant factor in determining green peel time.

EXAMPLE 3

A film-forming composition, designated herein as Composition A, was prepared by combining 124.8 parts by weight of cellulose acetate, 3.84 parts by weight of triphenyl phosphate, 15.36 parts by weight of di(2-methoxyethyl)phthalate, and 656.0 parts by weight of a solvent mixture consisting of 90.0 parts by weight methylene chloride, 6.0 parts by weight methanol, 1.0 parts by weight acetone and 3.0 parts by weight butyl alcohol. Additional film-forming compositions, designated herein as Compositions B through I, were prepared from the same ingredients except that they additionally contained one of the polyethoxylated phosphate esters, GAFAC RM-410, GAFAC RM-510, EMPHOS CS-141 or EMPHOS CS-136, in the amounts in parts by weight indicated below. The "green peel times" were measured for the films prepared from these compositions and the results obtained were as follows:

| Composition | GAFAC RM-410 | GAFAC RM-510 | EMPHOS CS-141 | EMPHOS CS-136 | Green Peel Time (seconds) |
| --- | --- | --- | --- | --- | --- |
| A | 0 | 0 | 0 | 0 | 80 |
| B | 0.25 | 0 | 0 | 0 | 75 |
| C | 0.62 | 0 | 0 | 0 | 45 |
| D | 0 | 0.25 | 0 | 0 | 75 |
| E | 0 | 0.62 | 0 | 0 | 50 |
| F | 0 | 0 | 0.25 | 0 | 50 |
| G | 0 | 0 | 0.62 | 0 | 45 |
| H | 0 | 0 | 0 | 0.25 | 65 |
| I | 0 | 0 | 0 | 0.62 | 50 |

As shown by the above data, the green peel time of 80 seconds for Composition A, which contained no polyethoxylated phosphate ester, was reduced to a level of as low as 45 seconds by the use of a small amount of polyethoxylated phosphate ester as a stripping aid. The level of 45 seconds was achieved with compositions C and G, in which the polyethoxylated phosphate ester was incorporated in the film-forming composition in an amount of 0.62 parts for 124.8 parts of cellulose acetate, which is equivalent to a concentration of 0.005 parts of polyethoxylated ester per part of cellulose acetate by weight.

EXAMPLE 4

A film-forming composition, designated herein as Composition A, was prepared by combining 15.60 parts by weight of cellulose acetate, 1.75 parts by weight of triphenyl phosphate, 0.65 parts by weight of di-(2-methoxyethyl) phthalate and 82.00 parts by weight of a solvent mixture consisting of 90.0 parts by weight methylene chloride, 6.0 parts by weight methanol, 1.0 parts by weight acetone and 3.0 parts by weight butyl alcohol. Additional film-forming compositions, designated herein as compositions B through L, were prepared from the same ingredients except that they contained a polyethoxylated phosphate esters, as identified below, in an amount of 0.005 parts per part by weight of cellulose acetate. The "green peel times" were measured for the films prepared from these compositions and the results obtained were as follows:

| Composition | Polyethoxylated Phosphate Ester | Green Peel Time (seconds) |
| --- | --- | --- |
| A | None | 80 |
| B | GAFAC RM-410 | 55 |
| C | EMPHOS CS-141 | 55 |
| D | EMPHOS CS-136 | 55 |
| E | EMPHOS PS-400 | 55 |
| F | EMPHOS PS-610 | 55 |
| G | EMPHOS PS-630 | 55 |
| H | EMPHOS PS-415 | 55 |

| Composition | Polyethoxylated Phosphate Ester | Green Peel Time (seconds) |
|---|---|---|
| I | EMPHOS PS-410 | 55 |
| J | EMPHOS PS-331 | 55 |
| K | EMPHOS PS-236 | 55 |
| L | EMPHOS PS-121 | 55 |

As shown by the above data, all of the polyethoxylated phosphate esters tested were equally effective in this composition in that each reduced the green peel time from 80 seconds to 55 seconds.

As shown by the above examples, incorporation of a small amount of a polyethoxylated phosphate ester in a cellulose ester composition effectively promotes stripping of the film from the surface on which it is cast. As compared to compositions which contain no polyethoxylated phosphate ester, a decrease in the minimum time required to permit successful stripping of as much as about 40 percent, or more, is achieved when the polyethoxylated phosphate ester is employed in an optimum amount.

The invention has been described in detail with particular reference to preferred embodiments thereof, but it will be understood that variations and modifications can be effected within the spirit and scope of the invention.

I claim:

1. In a method for the manufacture of a cellulose ester film in which a film-forming composition comprising a cellulose ester disolved in a solvent is cast upon a smooth surface, said solvent is partially evaporated, and said composition is stripped from said surface in the form of a film, the improvement comprising incorporating in said composition a polyethoxylated phosphate ester in an amount sufficient to promote stripping of said film.

2. A method as claimed in claim 1 wherein said polyethoxylated phosphate ester has the formula:

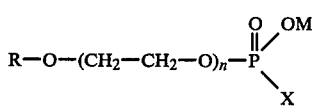

wherein R is a hydrocarbyl radical, n is an integer of from 1 to 100, M is hydrogen, ammonium, an alkali metal or an amino radical, and X is an —OM group or an R—O—(CH₂—CH₂—O)ₙ—group.

3. A method as claimed in claim 2 wherein R is an alkyl radical of 1 to 12 carbon atoms.

4. A method as claimed in claim 2 wherein R is an

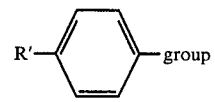

in which R' is an alkyl radical of 1 to 8 carbon atoms.

5. A method as claimed in claim 1 wherein said polyethoxylated phosphate ester is employed in an amount of from about 0.001 to about 0.01 parts per part by weight of said cellulose ester.

6. A method as claimed in claim 1 wherein said casting surface is a chromium-plated surface of a casting wheel.

7. A method as claimed in claim 1 wherein said cellulose ester is selected from the group consisting of cellulose acetate, cellulose propionate, cellulose butyrate, cellulose acetate propionate, cellulose acetate butyrate and cellulose propionate butyrate.

8. A film comprising a cellulose ester and a polyethoxylated phosphate ester.

9. A film as claimed in claim 8 additionally comprising a plasticizer.

10. A film as claimed in claim 8 wherein said cellulose ester is selected from the group consisting of cellulose acetate, cellulose propionate, cellulose butyrate, cellulose acetate propionate, cellulose acetate butyrate and cellulose propionate butyrate.

11. A film as claimed in claim 8 wherein said polyethoxylated phosphate ester has the formula:

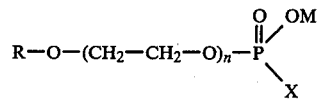

wherein R is a hydrocarbyl radical, n is a integer of from 1 to 100, M is hydrogen, ammonium, an alkali metal or an amino radical, and X is an —OM group or an R—O—(CH₂—CH₂—O)ₙ—group.

12. A film as claimed in claim 11 wherein R is an

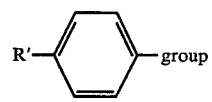

in which R' is an alkyl radical of 1 to 8 carbon atoms.

13. A film as claimed in claim 8 wherein said polyethoxylated phosphate ester is present in an amount of from about 0.001 to about 0.01 parts per part by weight of said cellulose ester.

14. A film as claimed in claim 9 wherein said plasticizer is triphenyl phosphate.

15. A film as claimed in claim 9 wherein said plasticizer is a mixture of triphenyl phosphate and di-(2-methoxyethyl)phthalate.

* * * * *